United States Patent
Ikeyama et al.

(10) Patent No.: US 9,255,209 B2
(45) Date of Patent: Feb. 9, 2016

(54) AIR-PERMEABLE SHEET IMPARTED WITH OIL REPELLENCY

(71) Applicant: NITTO DENKO CORPORATION, Ibaraki-shi, Osaka (JP)

(72) Inventors: Yoshiki Ikeyama, Osaka (JP); Junichi Moriyama, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/390,935

(22) PCT Filed: Apr. 2, 2013

(86) PCT No.: PCT/JP2013/002290
§ 371 (c)(1),
(2) Date: Oct. 6, 2014

(87) PCT Pub. No.: WO2013/150781
PCT Pub. Date: Oct. 10, 2013

(65) Prior Publication Data
US 2015/0166820 A1 Jun. 18, 2015

(30) Foreign Application Priority Data
Apr. 6, 2012 (JP) ................................. 2012-087048

(51) Int. Cl.
*B01D 53/22* (2006.01)
*C09D 133/16* (2006.01)
*B32B 27/30* (2006.01)
*C08J 7/04* (2006.01)
*B01D 46/00* (2006.01)

(52) U.S. Cl.
CPC .............. *C09D 133/16* (2013.01); *B01D 46/00* (2013.01); *B32B 27/30* (2013.01); *C08J 7/04* (2013.01); *C08J 7/047* (2013.01); *C08J 2333/16* (2013.01); *Y10T 428/24322* (2015.01)

(58) Field of Classification Search
CPC .......... A61F 13/512; B32B 27/30; C08J 7/04; C09D 133/16; D04H 1/70; D04H 1/465; Y10T 428/24322; B01D 46/00
See application file for complete search history.

(56) References Cited

U.S. PATENT DOCUMENTS

| | | | | |
|---|---|---|---|---|
| 4,768,857 A * | 9/1988 | Sakunaga et al. | ............... | 385/115 |
| 5,156,780 A * | 10/1992 | Kenigsberg et al. | ........... | 264/424 |
| 5,462,586 A * | 10/1995 | Sugiyama et al. | ................. | 96/13 |
| 6,228,477 B1 * | 5/2001 | Klare et al. | ................. | 428/315.5 |
| 6,723,147 B2 * | 4/2004 | Mashiko et al. | ............. | 55/385.1 |
| 7,199,197 B2 * | 4/2007 | Caldwell et al. | ............... | 526/242 |
| 8,338,529 B2 * | 12/2012 | Hoshino et al. | ............... | 524/589 |
| 8,512,428 B2 * | 8/2013 | Ueki et al. | .................... | 55/385.4 |
| 9,005,334 B2 * | 4/2015 | Furuyama et al. | ................ | 95/47 |
| 9,044,706 B2 * | 6/2015 | Furuyama et al. | .................... | 1/1 |
| 2003/0068459 A1 * | 4/2003 | Yializis | ........................ | 428/41.5 |
| 2008/0309717 A1 * | 12/2008 | Nakamoto | ...................... | 347/45 |
| 2009/0084498 A1 * | 4/2009 | Shimizu | ...................... | 156/304.1 |
| 2009/0169896 A1 * | 7/2009 | Sohn et al. | ..................... | 428/412 |
| 2010/0224817 A1 | 9/2010 | Jin et al. | | |
| 2012/0247647 A1 | 10/2012 | Moriyama et al. | | |
| 2013/0005928 A1 * | 1/2013 | Hoshino et al. | ............. | 526/329.7 |
| 2013/0074691 A1 | 3/2013 | Furuyama et al. | | |
| 2013/0087042 A1 | 4/2013 | Furuyama et al. | | |
| 2013/0283744 A1 | 10/2013 | Nakamura et al. | | |
| 2014/0023895 A1 * | 1/2014 | Ikeyama et al. | ................. | 429/82 |
| 2014/0137739 A1 * | 5/2014 | Ishii et al. | ......................... | 96/11 |
| 2015/0041127 A1 * | 2/2015 | Kuki et al. | ..................... | 166/266 |
| 2015/0089911 A1 * | 4/2015 | Ikeyama | ........................ | 55/524 |
| 2015/0165386 A1 * | 6/2015 | Mori et al. | ..................... | 166/266 |

FOREIGN PATENT DOCUMENTS

| | | | |
|---|---|---|---|
| CN | 101896572 | | 11/2010 |
| EP | 2 683 176 | | 1/2014 |
| JP | 2009-103662 | * | 4/1997 |
| JP | 2009-132667 | * | 5/1997 |
| JP | 2011-171728 | | 9/2009 |
| JP | 09-242679 | * | 10/2009 |
| JP | 2009-242679 | | 10/2009 |
| WO | WO 9101791 A | * | 2/1991 |
| WO | 2011/158408 | | 12/2011 |
| WO | 2011/158409 | | 12/2011 |
| WO | 2012/086606 | | 6/2012 |
| WO | 2012/117709 | | 9/2012 |

OTHER PUBLICATIONS

Machine Translation JP09-242679, Oct. 2009, Kashiwagi.*
Machine Translation JP2009-103662, Apr. 1997, Harada.*
Machine Translation JP2009-132667, May 1997, Masuda.*
Extended European Search Report for corresponding European Patent Application No. 13771971.2, Nov. 11, 2015, 6 pages.

* cited by examiner

*Primary Examiner* — Jason M Greene
*Assistant Examiner* — Anthony Shumate
(74) *Attorney, Agent, or Firm* — Hamre, Schumann, Mueller & Larson, P.C.

(57) ABSTRACT

Provided is an air-permeable sheet imparted with oil repellency, having a surface coated with an oil-repellent agent. The oil-repellent agent contains a linear fluorine-containing hydrocarbon group represented by $-R^1C_5F_{10}CH_2C_4F_9$ or $-R^2C_6F_{13}$, where $R^1$ and $R^2$ are each independently an alkylene group having 1 to 12 carbon atoms or a phenylene group. The air-permeable sheet is a resin sheet having air permeability in a thickness direction of the resin sheet, the resin sheet is a non-porous sheet having two or more through holes formed to extend in the thickness direction, and the through holes are straight holes extending straight through the resin sheet. This air-permeable sheet is imparted with oil repellency without significantly reducing its air permeability.

4 Claims, No Drawings

AIR-PERMEABLE SHEET IMPARTED WITH OIL REPELLENCY

TECHNICAL FIELD

The present invention relates to an air-permeable sheet imparted with oil repellency.

BACKGROUND ART

Air-permeable sheets obtained by forming through holes in non-porous resin sheets (hereinafter also referred to as "non-porous sheets") in their thickness direction are widely used in various applications due to their particularly high air permeability. For example, Patent Literature 1 shows a suction sheet as an example of the applications of such non-porous sheets having through holes formed therein.

The air-permeable sheets described above are attached to various products (hereinafter also referred to as "workpieces"). An adhesive layer is provided on a part of the front or back surface of the air-permeable sheet, and the air-permeable sheet is placed on a workpiece such that the adhesive layer is in contact with the workpiece. Then, the interior of the workpiece is evacuated through a vent hole of the workpiece (formed on the opposite side of the workpiece from the air-permeable sheet placed thereon) so as to hold the air-permeable sheet by suction. This attachment technique has not only an advantage that it is easier to place the air-permeable sheet but also an advantage that the air-permeable sheet is less likely to be displaced from the position where it is placed. The adhesive layer is preferably made of a pressure-sensitive adhesive because it can be easily removed to replace the air-permeable sheet by a new one, but instead, a hot-melt adhesive, a thermosetting adhesive, a tackiness agent, or the like may be used.

CITATION LIST

Patent Literature

Patent Literature 1: JP 2011-171728 A

SUMMARY OF INVENTION

Technical Problem

When the air-permeable sheet is used as a suction sheet as described above, oil on a base, an adhesive, or the like may penetrate the air-permeable sheet in its thickness direction and seep to the surface of the air-permeable sheet in contact with a workpiece. Therefore, the air-permeable sheet for some applications is subjected to oil-repellent treatment using a treating agent containing a fluorine-containing polymer.

It is well known that a fluorine-containing polymer having a linear perfluoroalkyl group (hereinafter, a "linear perfluoroalkyl group" may be referred to as an "Rf group") having 8 or more carbon atoms is suitable for imparting oil repellency. Rf groups having 8 or more carbon atoms have a significantly higher crystallinity than Rf groups having a smaller number of (for example, 6 or less) carbon atoms. This high crystallinity is considered to contribute to the development of excellent oil repellency. It is also known that, due to its high crystallinity, a treating agent having an Rf group having 8 or more carbon atoms exhibits a large receding contact angle, (which is one of the dynamic contact angles and the other of which is an advancing contact angle). The receding contact angle increases with increasing crystallinity, and sharply increases as the number of carbon atoms increases from 6 to 8. For these reasons, it is common practice to use a treating agent containing a fluorine-containing polymer having an Rf group having 8 or more carbon atoms to impart oil repellency to an air-permeable sheet. However, in the case where the surface of a resin sheet is subjected to oil-repellent treatment with a treating agent containing a fluorine-containing polymer having an Rf group having 8 or more carbon atoms, the air permeability of the resulting air-permeable sheet decreases significantly.

In view of the above circumstances, it is an object of the present invention to impart oil repellency to an air-permeable sheet formed of a non-porous resin sheet having through holes formed to extend in the thickness direction of the resin sheet, without significantly reducing its air permeability.

Solution to Problem

The present invention provides an air-permeable sheet imparted with oil repellency, having a surface coated with an oil-repellent agent. The oil-repellent agent contains a linear fluorine-containing hydrocarbon group represented by:
1) $-R^1C_5F_{10}CH_2C_4F_9$; or
2) $-R^2C_6F_{13}$,
where $R^1$ and $R^2$ are each independently an alkylene group having 1 to 12 carbon atoms or a phenylene group. The air-permeable sheet is a resin sheet having air permeability in a thickness direction of the resin sheet, the resin sheet is a non-porous sheet having two or more through holes formed to extend in the thickness direction, and the through holes are straight holes extending straight through the resin sheet.

Advantageous Effects of Invention

The oil-repellent agent having a linear fluorine-containing hydrocarbon group represented by 1) or 2) can impart oil repellency enough to meet practical requirements to an air-permeable sheet formed of a non-porous sheet having through holes formed to extend in the thickness direction of the sheet, without significantly reducing its air permeability. According to the present invention, it is possible to impart oil repellency to an air-permeable sheet formed of a non-porous sheet having through holes formed to extend in the thickness direction of the sheet, without significantly reducing its air permeability.

DESCRIPTION OF EMBODIMENTS

An air-permeable sheet of the present invention is formed of a non-porous sheet having two or more through holes formed to extend in the thickness direction of the sheet. The air-permeable sheet is useful particularly as a suction sheet because the sheet has air permeability in its thickness direction resulting from the through holes. The "non-porous sheet" mentioned above is typically an imperforate resin sheet having no holes other than the through holes. In other words, the non-porous sheet is a resin sheet having no air passages other than the through holes in the thickness direction.

In the present invention, the through holes are straight holes extending straight through the air-permeable sheet. As used herein, the "straight hole" refers to a through hole that is formed straight through the air-permeable sheet in its thickness direction from one principal surface of the sheet to the other principal surface thereof, with its cross-sectional shape being substantially constant. The straight hole is not limited only to a hole whose cross-sectional shape is constant in every part of the hole from one principal surface of the air-permeable sheet to the other principal surface thereof, and a hole whose cross-sectional shape varies slightly from place to place in the thickness direction of the air-permeable sheet is also included in the straight hole.

The air-permeable sheet has two or more through holes. As used herein, the "through hole" refers to a hole that is provided through the resin sheet from the front surface to the back surface thereof. The "two or more through holes" are, as a rule, through holes that are provided separately from each other. Two through holes overlapping each other (communicating with each other) are regarded as one through hole. The center line of each of the through holes extending in the thickness direction of the air-permeable sheet (hereinafter also referred to as the "axis of the through hole") is usually perpendicular to the principal surface of the air-permeable sheet, but the axis of the through hole may be inclined from the normal to the principal surface of the air-permeable sheet. The shape of the through holes is not particularly limited. For example, the openings of the through holes may be circular, or may be irregularly-shaped.

When the through holes provided in the air-permeable sheet have a circular shape, their opening diameter is preferably 20 μm or less, and more preferably 10 μm or less. The lower limit of the opening diameter of the through holes is not particularly limited, and it is, for example, 0.05 μm. In the case where the air-permeable sheet having through holes with an opening diameter of such a size is used as a suction sheet, a workpiece (for example, a ceramic green sheet) is less likely to be sucked into the through holes of the air-permeable sheet. On the other hand, when the opening diameter of the through holes is more than 20 μm, the workpiece may be sucked into the through holes because the opening diameter is too large. Even if the workpiece is not sucked into the through holes, a problem, such as the marks of the openings left on the surface of the workpiece, may occur. In particular, when a ceramic green sheet is used as a workpiece, the ceramic green sheet is sucked into the through holes, resulting in an uneven thickness of the ceramic green sheet. Therefore, in the step of stacking the ceramic green sheets, they are more likely to be poorly stacked.

The through holes can be formed in a resin sheet by, for example, subjecting the resin sheet to ion beam irradiation and etching. With this through hole formation technique, it is possible to form through holes whose opening diameters are uniform and whose axes extend in the same direction, and it is also possible to form through holes with very small diameters.

When the opening diameter of the through holes is equal to the average pore diameter of conventional porous sheets, the air-permeable sheet of the present invention has much lower air permeation resistance and thus higher air permeability than the conventional porous sheets. This is because the through holes in the air-permeable sheet of the present invention are straight holes having a substantially constant shape in the thickness direction of the air-permeable sheet and the air-permeable sheet has no air passages other than the through holes. This means that in the air-permeable sheet of the present invention, the suction force acts only in the thickness direction without diverging laterally when the sheet is held onto a workpiece by suction. Therefore, it is easy to hold the air-permeable sheet by suction on the workpiece. In contrast, a suction sheet formed of a conventional porous sheet has air permeability not only in its thickness direction but also in its transverse direction and part of the suction force diverges laterally. Therefore, it is difficult to hold the sheet by suction on the workpiece, or excessive suction pressure is required to hold the sheet by suction. Furthermore, since the conventional suction sheet is a porous sheet having irregularly-shaped air passages, the suction force applied to the workpiece varies from portion to portion. Therefore, strong suction force may be applied to some part of the workpiece and cause deformation thereof. An air-permeable sheet formed of a non-porous sheet having through holes is intended to eliminate these disadvantages of the conventional suction sheets. Since the distribution of the through holes in this air-permeable sheet can be controlled, the sheet can be held flatly against the workpiece by suction. This air-permeable sheet has another advantage that the suction pressure required is relatively low.

The material of the resin sheet forming the air-permeable sheet is not particularly limited as long as through holes can be formed in the material by ion beam irradiation and etching. Preferably, the material is hydrolytically and oxidatively degradable. Preferably, the resin sheet contains at least one resin selected from polyethylene terephthalate (PET), polycarbonate (PC), polyimide (PI), polyethylene naphthalate (PEN), and polyvinylidene fluoride (PVdF). Since these materials are degraded by an etching treatment liquid containing an alkaline substance or an oxidizing agent, through holes can be formed easily therein.

Examples of the alkaline substance used to etch the resin sheet include potassium hydroxide and sodium hydroxide. Examples of the oxidizing agent include chlorous acid and a salt thereof, hypochlorous acid and a salt thereof, hydrogen peroxide, and potassium permanganate. A suitable etching treatment liquid is different for different resin sheet compositions for use in air-permeable sheets. For example, in the case where a resin sheet made of polyimide (PI) is used, it is preferable to use an etching treatment liquid containing sodium hypochlorite as a main component. In the case of a resin sheet made of a resin other than polyimide (PI), an etching treatment liquid containing sodium hydroxide as a main component can be used.

For the thickness of the air-permeable sheet, it is difficult to determine the preferable range uniformly for any sheet because the preferable range varies from material to material. However, it is possible to determine the preferable range. The thickness of the air-permeable sheet is preferably 5 to 500 μm, more preferably 5 to 100 μm, and further preferably 5 to 50 μm. In the case where the material of the air-permeable sheet is PET, the thickness accuracy of the resin sheet is preferably about ±2 μm for the thickness of 5 to 100 μm.

In the present invention, an oil-repellent agent having a linear fluorine-containing hydrocarbon group represented by:
1) —$R^1C_5F_{10}CH_2C_4F_9$; or
2) —$R^2C_6F_{13}$
is used. Here, $R^1$ and $R^2$ are each independently an alkylene group having 1 to 12 carbon atoms or preferably 1 to 10 carbon atoms, or a phenylene group. The fluorine-containing hydrocarbon group represented by 1) or 2) is a linear fluoroalkyl group when $R^1$ or $R^2$ is an alkylene group. The term "linear" is intended to make it clear that the carbon skeleton of the fluorine-containing hydrocarbon group does not have two or more branched terminals, and is not intended to exclude the case where a phenylene group is contained as $R^1$ or $R^2$.

A linear perfluoroalkyl group (Rf group) is a functional group that has a $CF_3$ group exhibiting a low surface free energy and that imparts water/oil repellency to a coated surface. As described above, it is known that an Rf group having 8 or more carbon atoms has high crystallinity, and thus allows excellent oil repellency to develop. A treating agent containing a fluorine-containing polymer having an Rf group having 8 or more carbon atoms is suitable for imparting water/oil repellency to a substrate made of leather, paper, resin, or the like. However, when the treating agent is used for an air-permeable sheet formed of a non-porous sheet having straight through holes extending in the thickness direction of the sheet, the air permeability of the sheet may decrease significantly. The water/oil repellency imparted by this treating agent is useful particularly for applications that require large dynamic contact angles. However, it is generally sufficient that oil repellency enough to block penetration of ATF to be described later can be imparted to an air-permeable sheet. When a surface of the air-permeable sheet is coated with the oil-repellent agent having the linear fluorine-containing hydrocarbon group represented by 1) or 2), practically sufficient oil repellency can be imparted to the sheet without significantly reducing the air-permeability.

The oil-repellent agent is preferably a fluorine-containing polymer having a linear fluorine-containing hydrocarbon group as a side chain. In this fluorine-containing polymer, for example, the linear fluorine-containing hydrocarbon group is bonded to the main chain directly or via a functional group such as an ester group or an ether group.

Examples of the fluorine-containing polymer having the linear fluorine-containing hydrocarbon group represented by 1) or 2) include a polymer formed from monomers at least a part of which is a compound represented by:
a) $CH_2=CR^3COOR^1C_5F_{10}CH_2C_4F_9$; or
b) $CH_2=CR^4COOR^2C_6F_{13}$.

Here, $R^1$ and $R^2$ are as described above. In addition, $R^3$ and $R^4$ are each independently a hydrogen atom or a methyl group.

In the case where high oil repellency is required, a compound represented by a), or a compound represented by b) where $R^4$ is a methyl group, is preferably selected as a part of monomers. That is, in a preferred embodiment of the present invention, a polymer formed from monomers represented by:
a) $CH_2=CR^3COOR^1C_5F_{10}CH_2C_4F_9$; or
b) $CH_2=C(CH_3)COOR^2C_6F_{13}$
is used. Also here, $R^1$, $R^2$, and $R^3$ are as described above.

This fluorine-containing polymer may be formed by polymerizing only the compound(s) represented by a) and/or b) as monomers, but may be formed by copolymerizing the compound(s) with other monomers. Examples of the other monomers for copolymerization include various (meth)acrylic monomers. However, the other monomers are not limited to (meth)acrylic monomers. Any of various monomers having ethylenically unsaturated bonds, such as tetrafluoroethylene, may be used. The copolymer may be a random copolymer or a block copolymer. When the fluorine-containing polymer is a copolymer, the ratio of the compound represented by a) or b) in all monomers is preferably 60 mol % or more, and particularly preferably 90 mol % or more in order not to affect imparting of oil repellency. The polymerization of the compound can be performed according to a commonly-known method for polymerizing acrylic monomers, and can be carried out by solution polymerization or emulsion polymerization.

The average molecular weight of the fluorine-containing polymer is not particularly limited, and is, for example, about 1000 to 500000 in terms of the number average molecular weight.

Examples of the method for coating the surface of the air-permeable sheet with the oil-repellent agent include a method in which the air-permeable sheet is immersed into a solution prepared by dissolving the oil-repellent agent in a dissolving liquid, and a method in which the solution is applied or sprayed onto the air-permeable sheet. The appropriate concentration of the oil-repellent agent in the solution varies depending on the method for coating, and is about 0.1% by weight to 10% by weight in the case of the method in which the air-permeable sheet is immersed into the solution.

When the air permeability of the air-permeable sheet having been subjected to oil-repellent treatment is too low, the pressure difference between the interior and the exterior of a vent housing cannot be eliminated quickly. The air permeability is preferably 1.5 seconds/100 ml or less in terms of Gurley number, and more preferably 1.3 seconds/100 ml or less. The lower the Gurley number is, the higher the air permeability is. As shown in Examples described below, the present invention can provide an air-permeable sheet that has an air permeability of 1.5 seconds/100 ml or less in terms of Gurley number and that has a surface having practical oil repellency. The surface has such a degree of oil repellency that a 5 mm-diameter droplet of an organic solvent that is ATF to be described later does not penetrate the surface within 30 seconds after the droplet is applied onto the surface. The present invention can also provide an air-permeable sheet that has a thickness of 5 μm or more or even 10 μm or more in order to achieve the strength required for the air-permeable sheet, and that also has a low Gurley number as described above and has a surface having practical oil repellency.

EXAMPLES

Hereinafter, the present invention will be described in detail with reference to Examples and Comparative Example. However, the present invention is not limited to these Examples.

Example 1

As an air-permeable sheet, "ipPORE" (size: 20 cm×20 cm, thickness: 19 μm) manufactured by it4ip was prepared. The "ipPORE" is a resin sheet in which a number of through holes with an opening diameter of 5 μm are formed by subjecting an imperforate PET base sheet to treatment of ion beam irradiation and etching. In addition, a water/oil-repellent treatment liquid was prepared by diluting a water/oil-repellent agent "X-70-041" manufactured by Shin-Etsu Chemical Co., Ltd., with a diluting agent ("ASAHIKLIN AE-3000" manufactured by Asahi Glass Co., Ltd.) so that the concentration of the water/oil-repellent agent was 0.1% by weight. The "X-70-041" is a water/oil-repellent agent that includes a polymer formed from monomers including a compound having a linear fluoroalkyl group and represented by the following formula (a-1):

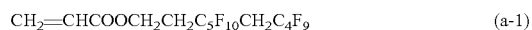
$$CH_2=CHCOOCH_2CH_2C_5F_{10}CH_2C_4F_9 \quad\quad (a\text{-}1)$$

The air-permeable sheet was immersed for about 3 seconds in the water/oil-repellent treatment liquid whose temperature was maintained at 20° C. Subsequently, the air-permeable sheet was left at ordinary temperature for about 1 hour to dry the sheet. Thus, an air-permeable sheet imparted with water/oil repellency was obtained.

Example 2

An air-permeable sheet was obtained in the same manner as in Example 1, except that a water/oil-repellent agent "X-70-042" manufactured by Shin-Etsu Chemical Co., Ltd., was used. The "X-70-042" is a water/oil-repellent agent that includes a polymer formed from monomers including a compound having a linear fluoroalkyl group and represented by the following formula (a-2):

$$CH_2=C(CH_3)COOCH_2CH_2C_5F_{10}CH_2C_4F_9 \quad\quad (a\text{-}2)$$

Example 3

100 g of a compound having a linear fluoroalkyl group and represented by the formula (b-1) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. A water/oil-repellent treatment liquid was prepared by diluting the fluorine-containing polymer with a diluting agent ("ASAHIKLIN AE-3000" manufactured by Asahi Glass Co., Ltd.) so that the concentration of the fluorine-containing polymer was 0.1% by weight.

$$CH_2=CHCOOCH_2CH_2C_6F_{13} \quad (b\text{-}1)$$

An air-permeable sheet was obtained in the same manner as in Example 1, except that the water/oil-repellent treatment liquid mentioned above was used.

Example 4

100 g of a compound having a linear fluoroalkyl group and represented by the formula (b-2) shown below, 0.1 g of azobisisobutyronitrile serving as a polymerization initiator, and 300 g of a solvent ("ASAHIKLIN AE-3000" manufactured by Asahi Glass Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. A water/oil-repellent treatment liquid was prepared by diluting the fluorine-containing polymer with a diluting agent ("ASAHIKLIN AE-3000" manufactured by Asahi Glass Co., Ltd.) so that the concentration of the fluorine-containing polymer was 0.1% by weight.

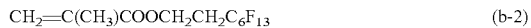

$$CH_2=C(CH_3)COOCH_2CH_2C_6F_{13} \quad (b\text{-}2)$$

An air-permeable sheet was obtained in the same manner as in Example 1, except that the water/oil-repellent treatment liquid mentioned above was used.

Comparative Example 1

100 g of a compound having a linear fluoroalkyl group and represented by the formula (c) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. A water/oil-repellent treatment liquid was prepared by diluting the fluorine-containing polymer with a diluting agent ("ASAHIKLIN AE-3000" manufactured by Asahi Glass Co., Ltd.) so that the concentration of the fluorine-containing polymer was 0.1% by weight.

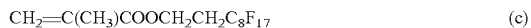

$$CH_2=C(CH_3)COOCH_2CH_2C_8F_{17} \quad (c)$$

An air-permeable sheet was obtained in the same manner as in Example 1, except that the water/oil-repellent treatment liquid mentioned above was used.

<Evaluation Results>

Air permeability test, oil repellency test, and water repellency test were carried out for the air-permeable sheets having been subjected to water/oil-repellent treatment in Examples and Comparative Example 1, and for an air-permeable sheet not having been subjected to water/oil-repellent treatment (that is, an untreated product of "ipPORE"). The air permeability test was carried out by the air permeability measurement method, B method (Gurley test method) specified in JIS L 1096. In the Gurley test method, the lower the air permeability property is, the higher the Gurley number is. This means that the lower the Gurley number is, the higher the air permeability is.

The oil repellency test was carried out in accordance with "textiles-oil repellency-hydrocarbon resistance test" specified in ISO 14419. Specifically, a droplet of an organic solvent having a diameter of about 5 mm was applied onto a surface of each air-permeable sheet using a pipette, and whether or not penetration of the droplet occurred within 30 seconds after application of the droplet was visually observed. As the organic solvent, ATF (transmission oil, Toyota's standard automatic transmission fluid, Type T, Product No. 08886-00405) was used. For the penetration of the droplet, it was determined that "penetration occurred" when the droplet was absorbed into the air-permeable sheet or when the color of the air-permeable sheet changed due to the penetration of the droplet. The water repellency test was carried out by the same test method as the oil repellency test, except that water was used instead of the organic solvent used for the oil repellency test. Table 1 shows the results.

TABLE 1

| | Water/oil repellency test | | Gurley number |
|---|---|---|---|
| | ATF | Water | (seconds/100 ml) |
| Untreated product | x | x | 1.1 |
| Example 1 | o | o | 1.1 |
| Example 2 | o | o | 1.3 |
| Example 3 | o | o | 1.2 |
| Example 4 | o | o | 1.2 |
| Com. Example 1 | o | o | 2.0 | o: Penetration did not occur
x: Penetration occurred

The Gurley number of the sheet of Comparative Example 1 was more than 1.8 times that of the untreated product. This revealed that although the oil-repellent treatment using a linear perfluoroalkyl group (Rf group) having 8 or more carbon atoms is advantageous in exhibiting oil repellency, the oil-repellent treatment hinders the maintenance of the air permeability. In contrast, in Examples 1 to 4, the Gurley number was higher than that of the untreated product but the difference between them was only about 1.2 times.

The results of the "water/oil repellency test" in Table 1 reveal that the air-permeable sheets of Examples 1 to 4 each have oil repellency enough to block penetration of ATF. It can be said that the levels of the oil repellency of Examples 1 to 4 are quite comparable to that of Comparative Example 1. Such a surface that blocks penetration of this organic solvent can meet practical requirements for the properties needed for use as an air-permeable sheet.

The above results are summarized as follows. The air-permeable sheets of the present invention (Examples 1 to 4) have oil repellency enough to meet practical requirements, without significantly reducing their air permeability. Thus, the effect of the present invention was confirmed.

The invention claimed is:

1. An air-permeable sheet imparted with oil repellency, comprising a surface coated with an oil-repellent agent, wherein
the oil-repellent agent comprises a linear fluorine-containing hydrocarbon group represented by —$R^1C_5F_{10}CH_2C_4F_9$, where $R^1$ is an alkylene group having 1 to 12 carbon atoms or a phenylene group,
the air-permeable sheet is a resin sheet having air permeability in a thickness direction of the resin sheet,
the resin sheet is a non-porous sheet having two or more through holes formed to extend in the thickness direction, and
the through holes are straight holes extending straight through the resin sheet.

2. The air-permeable sheet according to claim 1, wherein the oil-repellent agent is a polymer formed from monomers at least a part of which is a compound represented by:

$$CH_2=CR^3COOR^1C_5F_{10}CH_2C_4F_9$$

where $R^3$ is a hydrogen atom or a methyl group.

3. The air-permeable sheet according to claim 1, wherein the resin sheet comprises at least one resin selected from polyethylene terephthalate (PET), polycarbonate (PC), polyimide (PI), polyethylene naphthalate (PEN), and polyvinylidene fluoride (PVdF).

4. The air-permeable sheet according to claim 1, wherein the through holes have an opening diameter of 20 μm or less.

* * * * *